(12) United States Patent
Schouest

(10) Patent No.: US 6,389,629 B1
(45) Date of Patent: May 21, 2002

(54) HINGED LOADING RAMP

(75) Inventor: Paul Daryl Schouest, Breaux Bridge, LA (US), as part interest

(73) Assignee: Ginger Schouest, Breaux Bridge, LA (US); a part interest ( * ) Notice: Subject to any disclaimer, the term of this patent is extended or adjusted under 35 U.S.C. 154(b) by 0 days.

(21) Appl. No.: 09/630,843

(22) Filed: Aug. 2, 2000

(51) Int. Cl.$^7$ ............................... E01P 1/00; E05D 1/06
(52) U.S. Cl. ......................... 14/69.5; 16/269; 119/849
(58) Field of Search .......................... 14/69.5; 119/847, 119/849; 16/221, 260, 271, 225, 269; 160/235; 414/537; 296/61

(56) References Cited

U.S. PATENT DOCUMENTS

| | | | |
|---|---|---|---|
| 3,423,780 A | * | 1/1969 | Alten .......................... 14/69.5 |
| 3,517,791 A | * | 6/1970 | Miles .......................... 14/69.5 |
| 3,984,891 A | * | 10/1976 | Weinmann ................... 14/69.5 |
| 4,470,444 A | * | 9/1984 | Riexinger et al. ........... 160/235 |
| 5,277,436 A | * | 1/1994 | Frank et al. .................. 280/5.2 |
| 5,347,672 A | * | 9/1994 | Everard et al. ............... 14/69.5 |
| 5,446,937 A | * | 9/1995 | Haskins ....................... 14/69.5 |
| 5,457,837 A | * | 10/1995 | Zuckerbrod ................. 14/69.5 |
| 5,622,102 | * | 4/1997 | Schijf 52/71 |
| 5,938,397 A | * | 8/1999 | Schouest .................... 414/537 |

* cited by examiner

*Primary Examiner*—Gary S. Hartmann
(74) *Attorney, Agent, or Firm*—Dominigue & Waddell, PLC

(57) ABSTRACT

A foldable ramp apparatus. The ramp apparatus comprises a first and second ramp member. The first ramp includes a channel insert, and the second ramp includes an arcuate insert. The arcuate insert is configured to pivotally engage the channel insert. The arcuate insert has a curved apex that is adapted to be received within an elongated channel of the channel insert. A slotted segment is formed on a pair of legs that extends from the arcuate insert. A corresponding slotted segment formed on a pair of legs that extends from the channel insert. A cross-member is placed within the slotted segment interconnecting the pair of legs. In the preferred embodiment, the ramp apparatus further comprises a first lip formed on the arcuate portion and configured to engage an underside of the first leg and the second leg of the first ramp as well as the slotted segment. A second lip may be formed on the grooved portion and configured to engage an underside of the first leg and the second leg of the second ramp. Additionally, a first ledge is formed on the arcuate insert and a second ledge is formed on the channel insert, with the first and second ledge being operatively inserted into the slotted segment to attach the legs to the arcuate and channel insert.

13 Claims, 6 Drawing Sheets

HINGED LOADING RAMP

BACKGROUND OF THE INVENTION

This invention relates to a ramp apparatus. More particularly, but not by way of limitation, this invention relates to a hinge apparatus and a ramp apparatus that is used to load and unload cargo, materials, vehicles, etc. from a first platform to a second platform.

In the transportation of cargo, materials, vehicles, etc., operators find it necessary to load and unload from a first platform to a second platform. For instance, all terrain vehicles (ATV's) have become very popular. Operators will load the ATV's onto the bed of a truck. In order to transport the ATV into the bed, or alternatively out of the truck bed, a ramp is employed. An example of such a ramp is seen in U.S. Pat. No. 4,478,549 to Stelly and Araund entitled "FOLDABLE LOADING RAMP FOR ALL TERRAIN/RECREATIONAL VEHICLES AND THE LIKE".

Many times, the vehicle and/or cargo being loaded or unloaded is very heavy. Therefore, the ramps need to be constructed with sturdy materials and designed to withstand significant loads. Moreover, the ramps must be portable. In many cases, the ramp is transported with the cargo so that once the operator arrives at the proper location, the cargo is unloaded. Prior art ramps have accomplished these design features. For instance, U.S. Pat. No. 5,938,397 to P. D. Schouest discloses a useful mating pair of loading and unloading ramps for use with pickup trucks, trailers and vans.

However, storage space is a premium. There is a need for these ramps to be portable, and once stored, to take up a minimum of space. Additionally, the folded ramps must be easy to handle. The ramp must be economical to manufacture. Prior and ramps use longitudinal hinges for folding lengthwise. Once these prior art ramps have been folded, they still require significant longitudinal space.

Therefore, there is a need for a portable ramp. There is also a need for a ramp that is easily stored. Further, there is a need for a ramp that can handle weighty loads. Additionally, there is a need for cost effective method of manufacturer of these ramps. These, and many other needs, will be met by a reading of the following description of the invention.

SUMMARY OF THE INVENTION

A ramp apparatus is disclosed. The ramp apparatus comprises a first and second ramp member. The first ramp includes a channel insert and the second ramp includes an arcuate insert. The arcuate insert is configured to pivotally engage the channel insert.

A slotted segment is formed on a first side of a first leg that extends from the arcuate insert. A corresponding slotted segment formed on a first side of a second leg that extends from the arcuate insert. A cross-member is placed within the slotted segment interconnecting the first leg and the second leg.

In one of the preferred embodiments, the second ramp member includes a third leg and a fourth leg, and wherein the ramp apparatus further comprises a slotted segment formed on a first side of the third leg. A corresponding slotted segment is formed on a first side of the fourth leg of the channel insert. A cross-member is placed within the slotted segment interconnecting the third leg end the fourth leg.

The ramp apparatus may further comprise a first ledge extending from the channel insert, the first ledge being received within the corresponding slotted segment of the first ramp member. A second ledge may extend from the arcuate insert, with the second ledge being received within the slotted segment of the second ramp member.

In the preferred embodiment, the ramp apparatus further comprises a first lip formed on the arcuate insert and configured to engage an underside of the first leg and the second leg of the second ramp. A second lip may be formed on the channel insert and configured to engage an underside of the first leg and the second leg of the first ramp. Accordingly, a cross-member may be placed between the first and second leg and the cross-member placed between the third and fourth leg. The ramp apparatus, in the must preferred embodiment, is constructed of an aluminum metal member.

A hinge apparatus is also disclosed. The hinge apparatus comprises an arcuate member having a first side and a second side, with a first leg extending from the first side and a second leg extending from the second side. A channel member is included having a third side and a fourth side, with a third leg extending from the third side and a fourth leg extending from the fourth side. The arcuate member is configured to engage the channel member.

In the preferred embodiment, the first leg, second leg, third leg, and fourth leg comprise an elongated tubular member having a passage formed thereon. The channel member contains a first ledge that engages the passage of the first leg and a second ledge that engages the passage of the second leg. The arcuate member contains a third ledge that engages the passage of the third leg, and a fourth ledge that engages the passage of the fourth leg.

The hinge apparatus may further comprise a first lip extending from the first side of the channel member, and wherein the first lip is adopted to engage an underside of the first leg. A second lip extends from the second side of the channel member, and wherein the second lip is adopted to engage an underside of the second leg.

A third lip may be included that extends from the first side of the arcuate member, and wherein the third lip is adopted to engage an underside of the third leg. A fourth lip that extends from the second side of the arcuate member is provided, and wherein the fourth lip is adopted to engage an underside of the fourth leg.

An advantage of the present invention is that a ramp can be folded into two parts at the hinge. Another advantage is that the ramp is portable and movable. Yet another advantage is that the ramp and hinge design results in a strong and sturdy apparatus that can be used to load and unload heavy cargo.

Another advantage is that the ramp and hinge are easily manufactured. Still yet another advantage is that the ramp with hinge can be manufactured from an assortment of metals including aluminum, steel, etc. Yet another advantage is that the ramp sides are connected by either mesh or cross bars. Another advantage is that the ramps are cost effective to manufacture.

A feature of the present invention is that the tubing used as the sides of the ramp have an elongated slot. Another feature is that the arcuate member is configured to engage an elongated channel. Yet another feature is that the arcuate member and channel member are configured to be inserted into the elongated slot of the tubing. Still yet another feature is that the tubing serves as sides for the ramp.

DETAILED DESCRIPTION OF THE PREFERRED EMBODIMENTS

Figure 1A:
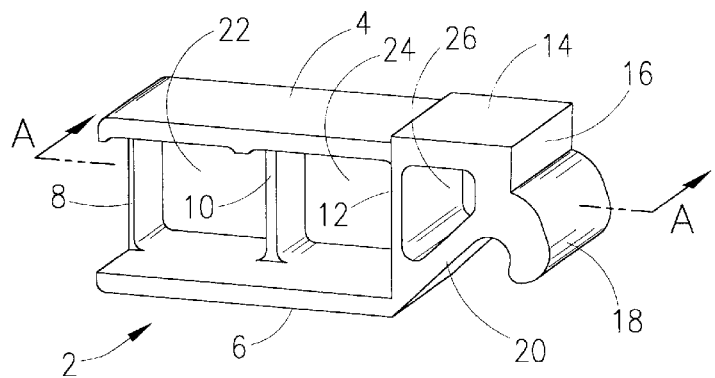
FIG. 1A is perspective view of the arcuate member of the present invention.

Referring now to FIG. 1A, a perspective view of the arcuate member 2 of the present invention will now be described. The arcuate member 2 contains a body with a top face 4 and a bottom face 6. A first structural wall 8 connects the top face 4 with the bottom face 6; a second structural wall 10 also connects the top face 4 with the bottom face 6. As illustrated, the first wall 8 extends one-half the width of the top face 4 and the bottom face 8; the second wall 10 extends one-half the width of the top face 4 and the bottom face 6.

A third structural wall 12 is shown, with the third wall 12 extending the entire width. The third wall 12 extends to the top portion 14 which in turn extends to the flat surface 16. In the preferred embodiment, the surface 16 is disposed at an angle to the true vertical. A curved lip segment 18 extends from the flat surface 18. A diagonal wall 20 stretches from the bottom of the third and 12 to the bottom end of the flat surface 16. The passage 22, 24, 26 are formed there through.

Figure 1B:
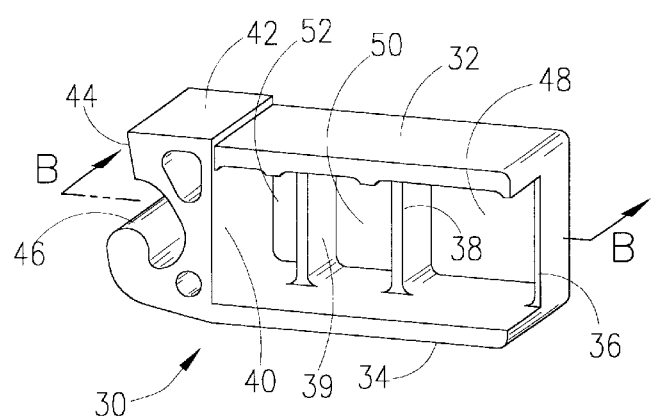
FIG. 1B is a perspective view of the channel member of the present invention.

Referring now to FIG. 1B, a perspective view of the channel member 30 will now be described. The channel member 30 contains a body with a top face 32 and a bottom face 34. A first structural wall 36 connects the top face 32 with the bottom face 34, a second structural wall 38 also connects the top face 32 with the bottom face 34. As illustrated, the first wall 38 extends one-half the width of the top face 32 and the bottom face 34; the second wall 38 extends one-half the width of the top face 32 and the bottom face 34; also shown is wall 38.

A third structural wall 40 is shown, with the third wall 40 extending the entire width. The third wall 40 extends to the top portion 42 which in turn extends to the flat surface 44. In the preferred embodiment, the surface 44 is disposed at an angle to the true vertical. The surface 16 and the surface 44 are configured so that the joined ramps will be offset from vertical at an angle which will be described later in the application with reference to FIG. 8. A reciprocal curved lip segment 46 extends from the flat surface 44. The curved lip segment 18 is inserted into the reciprocal curved lip segment 48 as will be seen and further explained later in the application. The passages 48, 50, 52 are formed there through. Thus, the arcuate insert 2 has a curved apex that is adapted to be received within an elongated channel of the channel insert 30.

Figure 2A:
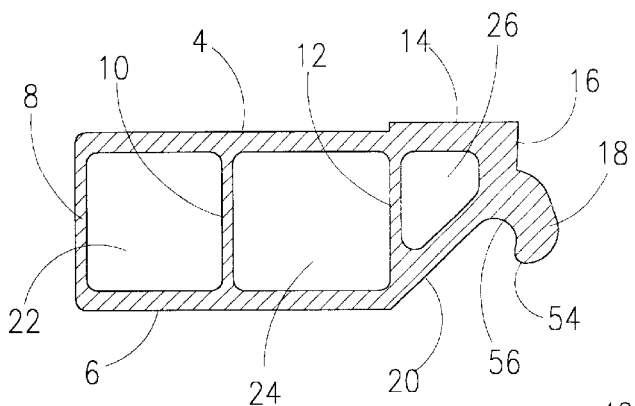
FIG. 2A is a cross-sectional view of the arcuate member taken from line A—A of FIG. 1A.

In FIG. 2A, a cross-sectional view of the arcuate member taken from line A—A of FIG. 1A will now be described. It should be noted that like numerals refer to like components in the various figures of the application. The top face 4 extends to the top portion 14 while the bottom face 6 extends to the diagonal wall 20. FIG. 2A further depicts the apex 54 of the curved lip segment 18 as well as the elongated cavity 56. The diagonal wall 20 extends to the elongated cavity 56, as shown.

Figure 2B:
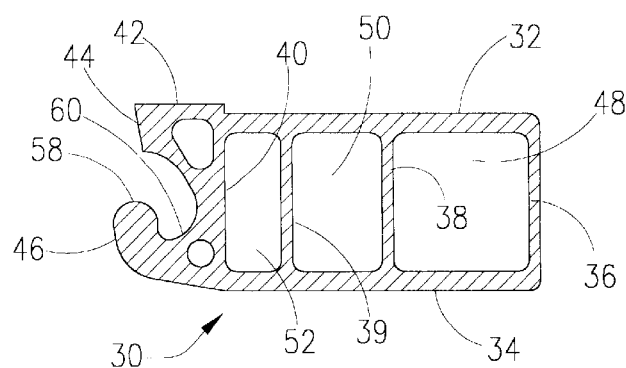
FIG. 2B is a cross-sectional view of the arcuate member taken from line B—B of FIG. 1B.

In FIG. 2B, a cross-sectional view of the channel member 30 taken from line B—B of FIG. 1B will be discussed. As seen earlier, the channel member 30 contains a top face 32 and a bottom face 34, along with the walls 36, 38 and 40. A top portion 42 extends to the reciprocal curved lip segment 46. The lip 46 contains the apex 58 that in turn extends to the elongated cavity 50. Thus, the apex 54 cooperates with and fits into the channel 50, while the apex 58 cooperates with and fits into the channel 56.

Figure 3A:
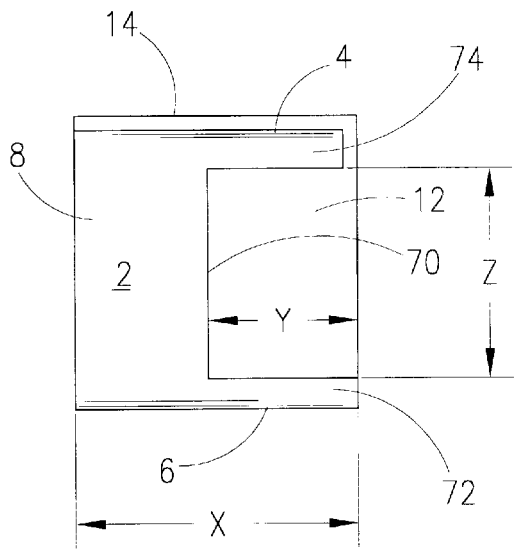
FIG. 3A is a rear view of the arcuate member.
Figure 3B:
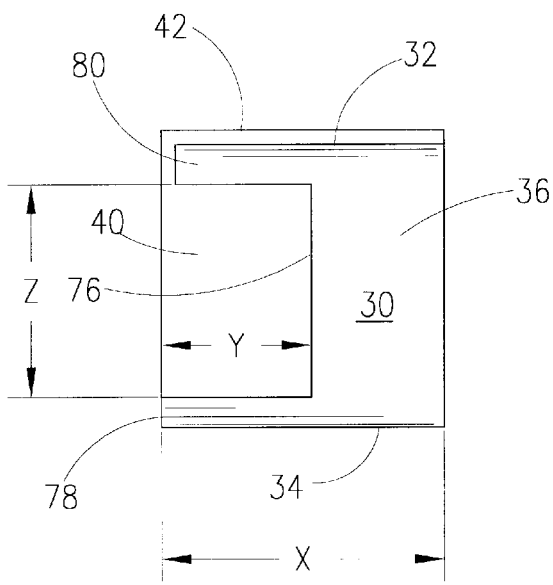
FIG. 3B is a rear view of the channel member.

Referring now to FIG. 3A, the rear view of the arcuate member 2 will be discussed. This rear view depicts the slot (denoted by the numeral 70) by having the walls 8, 10 extend approximately half the width of the top 4 and bottom face 6. In other words, the top and bottom face 6 extend the length of "x", and the walls 8, 10 extend the length "y". The slot 70 leaves a portion of the underside 72 (also referred to as a lip) and a topside 74 (also referred to as a ledge). The height of the slot is denoted by the letter "z".

In FIG. 38, the rear view of the channel member 30 is depicted. This rear view depicts the slot (denoted by the numeral 76) by having the walls 36, 38 extend approximately half of the width of the top 32 and bottom face 34. In other words, the top 32 and bottom face 34 extend the length of "x", and the walls 32, 34 extend the length "y". The slot 76 leaves a portion of the underside 78 (also referred to as a lip) and a topside 80 (also referred to as a bottom ledge). The height of the slot is denoted by the letter "z".

Figure 4:
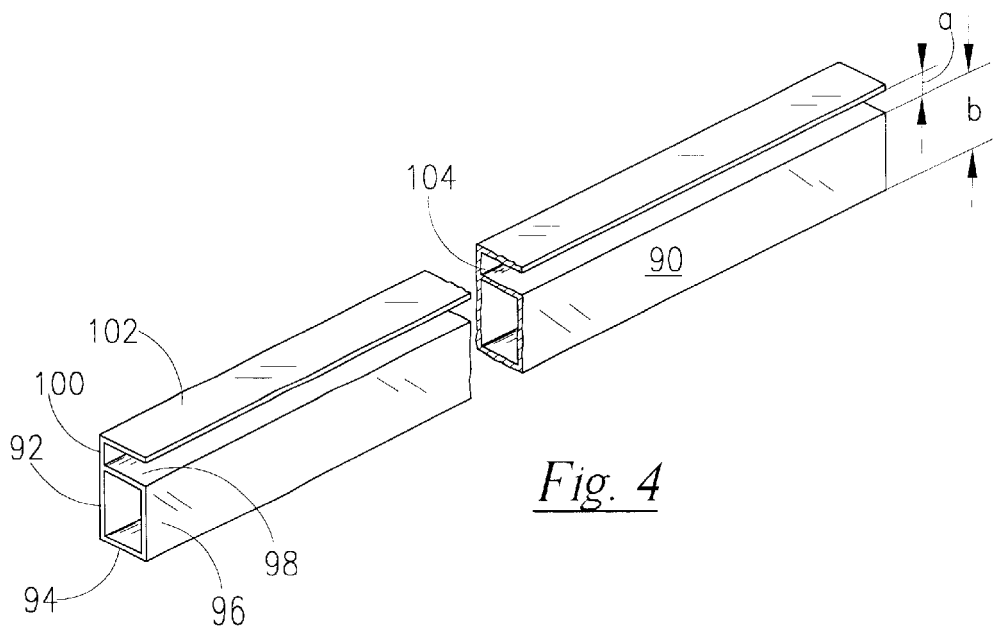
FIG. 4 is a perspective view of the tubing.

FIG. 4, which is a perspective view of the tubing 90, will now be explained. The tubing 90 contains a generally rectangular hollow body having first side 92, second side 94, third side 96, and fourth side 98. The tubing 90 includes an extension side 100 that in turn contains an extension leg 102, with the extension leg 102 being generally parallel with the side 98. A slot 104 of the length "a" is depicted and the length of the side 96 being depicted by the letter "b". The slot 104 length "a" is sized to cooperate and receive the ledges 74, 80. The side 98 is sized to cooperate and fit into the slot 104, as will be seen with reference to FIG. 7.

Figure 5:
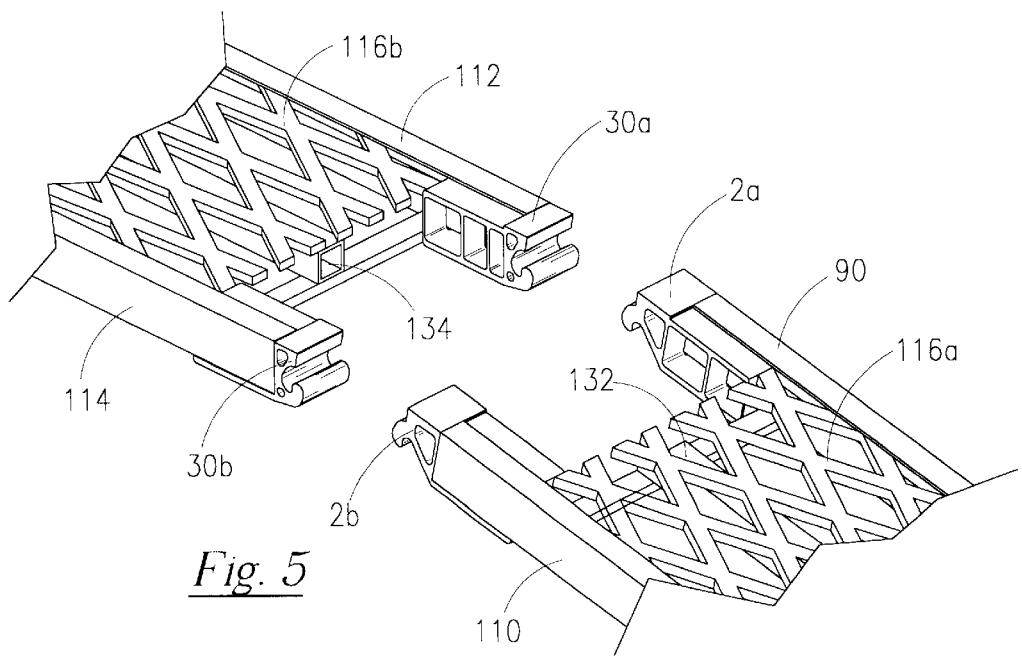
FIG. 5 is a perspective view of the arcuate member and channel member with the tubing extending therefrom.

Referring now to FIG. 5, a perspective view of the arcuate members 2a, 2b and channel members 30a, 30b with tubing members 90, 110, 112, 114 extending therefrom will now be discussed. The arcuate member 2a is generally a mirror image of arcuate member 2b. The arcuate member 2a is essentially identical to arcuate member 2b except that the half walls are on opposite sides so that the arcuate member can be connected to the tubing as taught by this application. The channel member 30a is generally a mirror image of the channel member 30b. Thus, the arcuate member 2a is connected to the tubing 80; arcuate member 2b is connected to the tubing 110; channel member 30a is connected to the tubing 112; and, channel member 30b is connected to the tubing 114. FIG. 5 also depicts the cross wire mesh 116a, 118b that links the tubings as taught by this invention.

Figure 6:
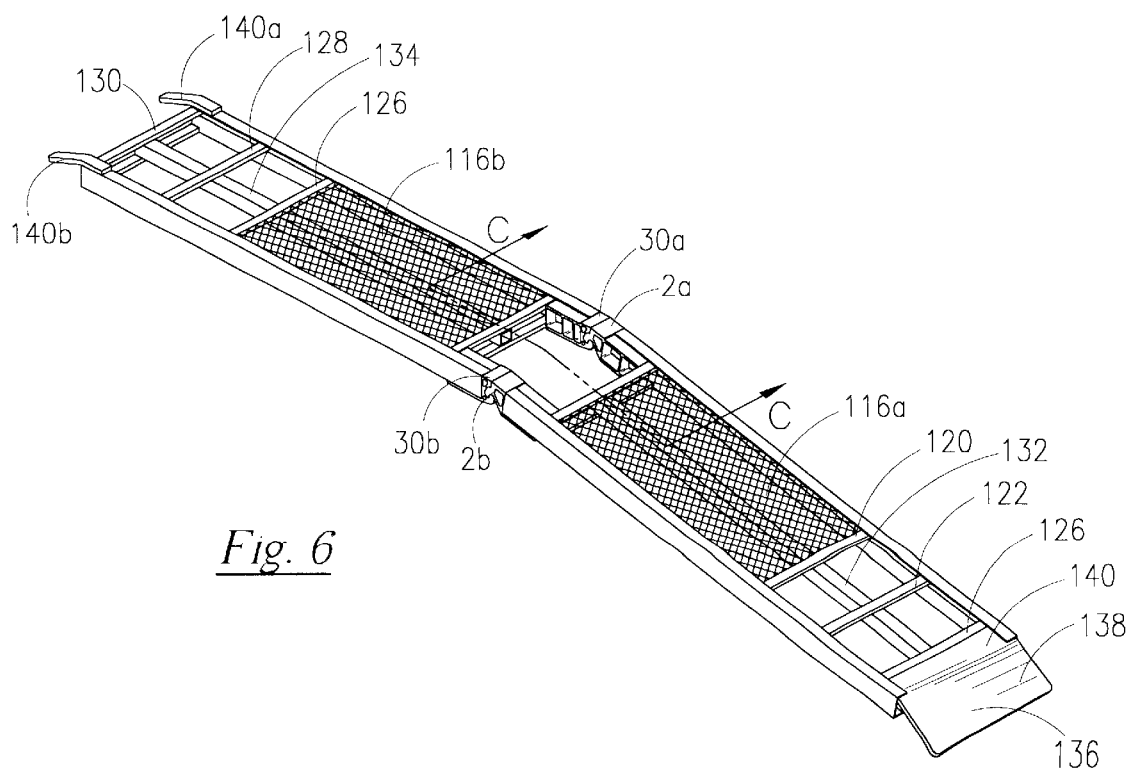
FIG. 6 is an isometric view of one of the embodiments of a ramp member.

In FIG. 6, an isomeric view of one of the embodiments of a ramp member will now be discussed. The arcuate members 2a, 2b have been connected to the channel members 30a, 30b. Additionally, a plurality of cross-bars 120, 122, 124, 126, 128, 130 have been added that links the tubing together. The cross wire mesh 116a, 116b is also included. The cross-bar ends are fitted into the slot 104, and the cross-bar ends may be fastened within the slots 104 of the tubing by conventional means such as welding means. Additionally, a first reinforcement bar 132 and a second reinforcement bar 134 is provided. The reinforcement bars 132, 134 are connected to the underside of the cross-bars 120–130 in the preferred embodiment. The reinforcement bars are connected via conventional means such as welding. In the preferred embodiment, the reinforcement bars are rectangular in cross-section.

FIG. 6 also depicts the angled plate 136 that is attached to the end of the ramp. The angled plate 136 has a first flat surface 138 that angularly extends to a second flat surface 140. The angled plate 136 facilitates entry of the wheel of the on or off loading object onto the ramp, particularly when the object has a long base, as will be readily understood by those of ordinary skill in the art. Additionally, there is included the prongs 140a, 140b that are configured to rest and latch onto the truck bed platform during use.

Figure 7:
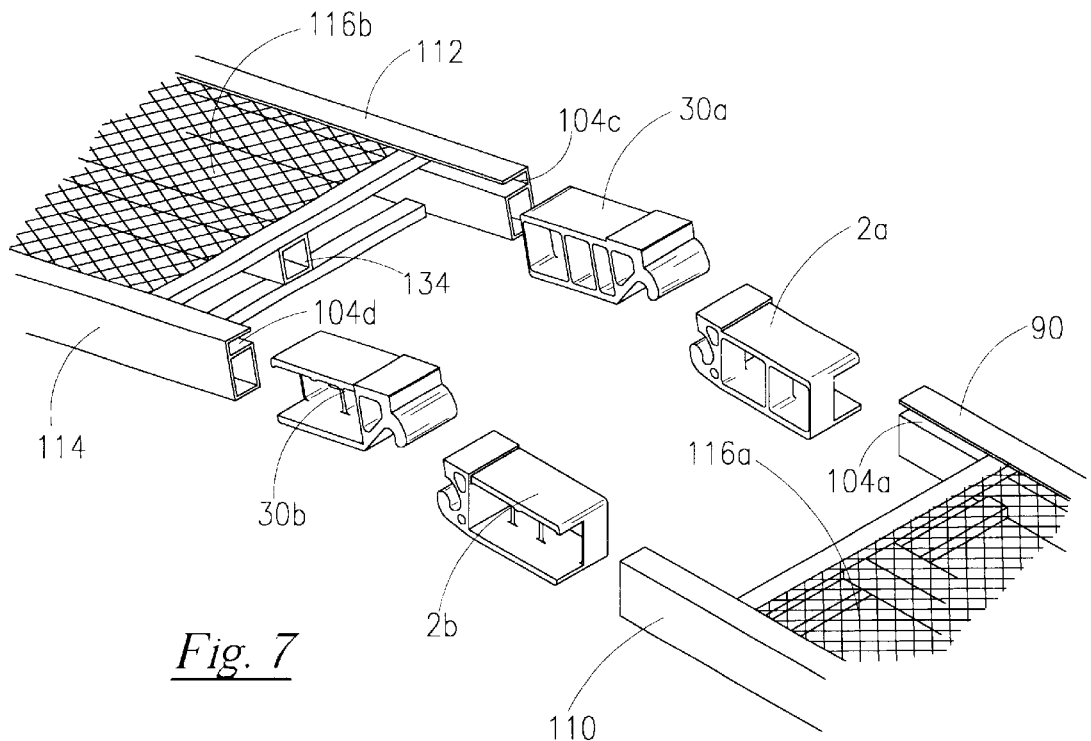
FIG. 7 is an exploded view of the novel ramp and hinge apparatus of the present invention.
Figure 10:
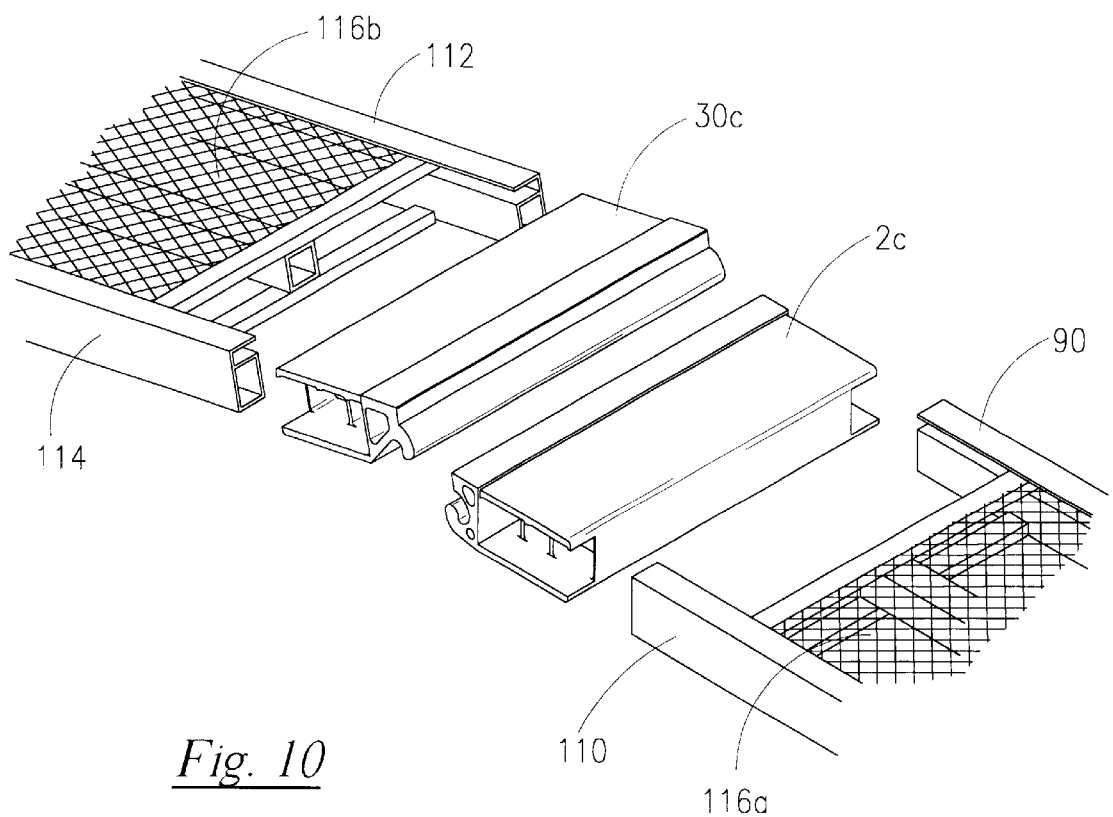
FIG. 10 is a perspective view of a second embodiment of the ramp member.

FIG. 7 is an exploded view of the novel ramp and hinge apparatus seen in FIG. 6. Thus, the tubing 90 is shown along with the slot 104a; tubing 110 is shown along with the slot 104b (not shown), tubing 112 is shown along with the slot 140c; and, tubing 114 is shown along with the slot 104d. The arcuate member 2a, 2b and the channel member 30a, 30b are depicted. It should be noted that according to the teachings of the present invention, the arcuate member may be one single member and the channel member may be one single member such as seen in FIG. 10.

The slots 104a and 104b are depicted in FIG. 7, along with the reinforced bar 134 on the underside of the wire mesh screen 116b. The ends of the mesh 116b slits into the slotted areas 104c, 104d as per the teachings of the present invention. The ends of the mesh 136 may be fastened within the slots by conventional means such as welding.

Figure 8:
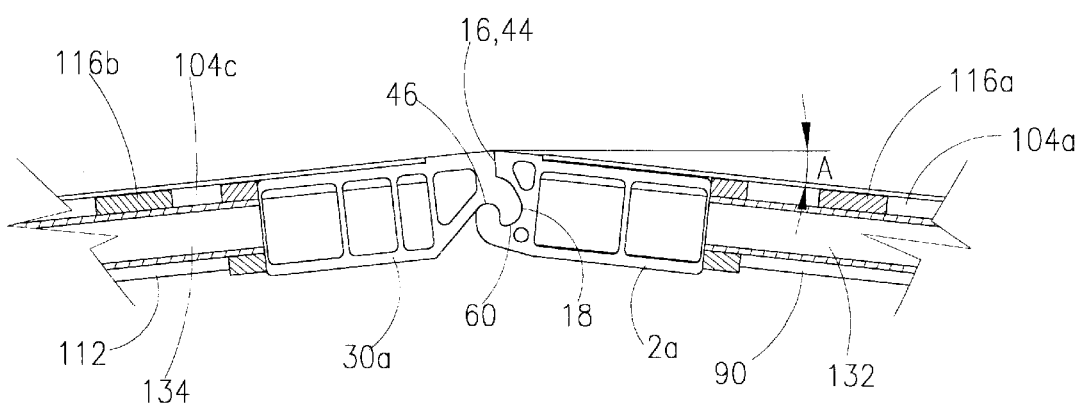
FIG. 8 is a cross-sectional view of the arcuate member and the channel member taken from the C—C of FIG. 6.

Referring now to FIG. 8, a cross section view taken on line C—C from FIG. 6 of the arcuate member 2 and the channel member 30 are illustrated in an engaged position. Thus, the curved lip segment 18 is engaged with the reciprocal curved lip segment 46, and in particular, the elongated cavity 60. The tubing 90 extends from the arcuate member 2 while the tubing 112 extends from the channel members 30a. FIG. 8 also depicts the slot 104b that has the arcuate member 2 fitted therein and slot 104d that has the channel member 30 fitted therein as previously described.

As noted earlier, the surface 16 and the surface 44 are configured so that the joined ramps will be offset from vertical at an angle. This inclination in the joined ramps has several advantages. One, the loading and off loading of equipment becomes easier since the ramp contains this slope—a totally flat service would create problems since one end of the ramp is located near a ground level and a second level may be located on the bed of a truck. Second, the offset angle of inclination creates a distribution of forces that strengthens the structure of the ramp since a generally downward force can be transferred from one ramp to the other ramp during the loading and unloading phase. This list is illustrative. FIG. 8 also depicts the angle A that is formed due to the novel teachings of the present invention.

Figure 9:
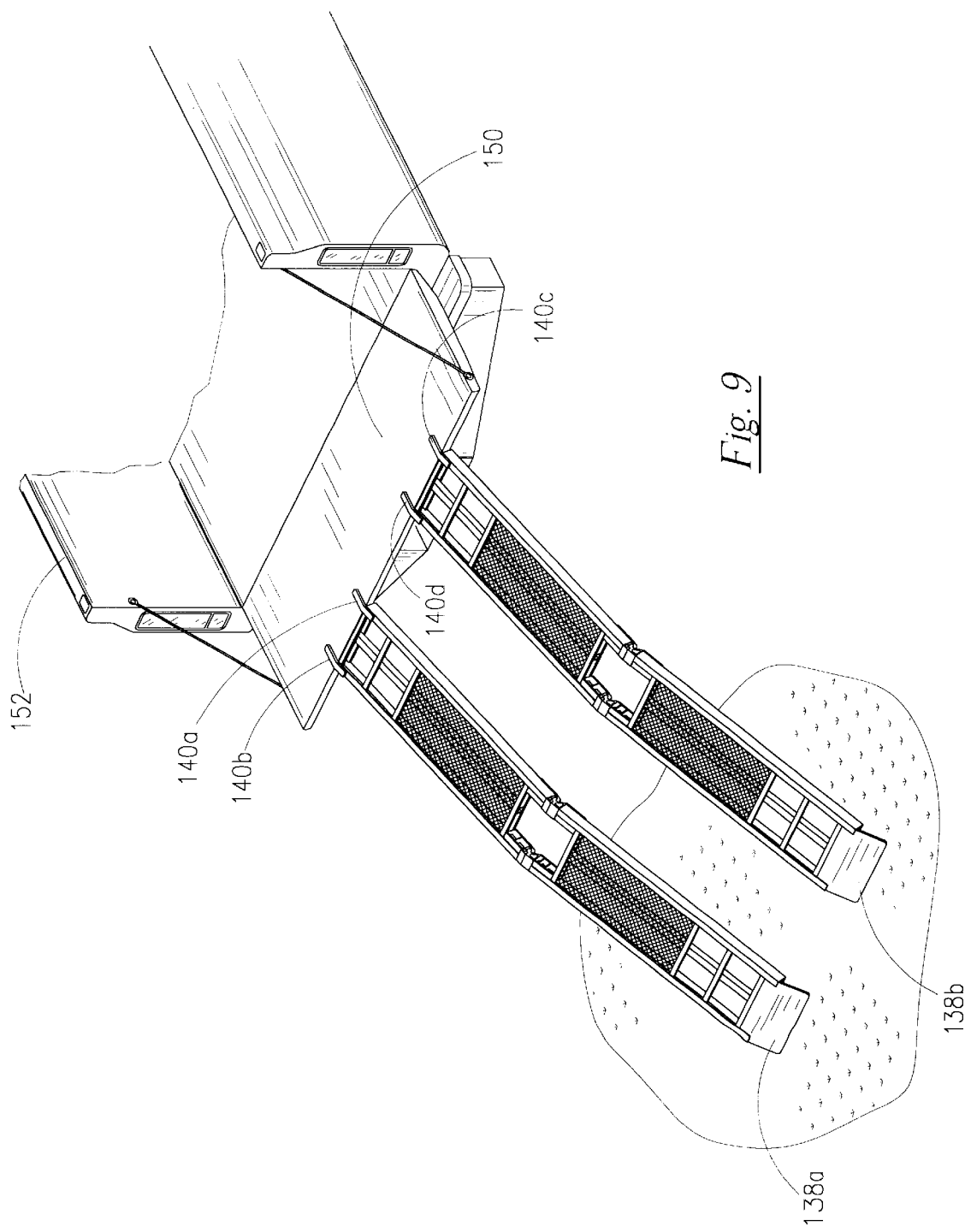
FIG. 9 is a perspective view of the preferred embodiment of the assembled ramp member positioned for loading and unloading from a vehicle.

FIG. 9 is a perspective view of the ramp deployed for use. The ramp has the prongs 140a, 140b, 140c, 140d resting on the tall gate 150 of a vehicle, such as a pickup truck 152. The surfaces 138a, 138b are resting on the ground. Thus, the cargo can be loaded, or alternatively, off loaded from the truck bed to the ground level as is understood by those of ordinary skill in the art. FIG. 10 depicts the second embodiment of the invention. Generally, this embodiment contains the arcuate member 2c as a continuous member (i.e., rather than having a first 2a and second 2b member, the arcuate member is one elongated member). The channel member 30c is also a continuous member (i.e., rather than having a first 30a and second 30b member, the channel member is one elongated member). The arcuate 2c and channel member 30c are configured to cooperate and engage with the tubing members 90, 110, 112, 114 as previously discussed.

Changes and modifications in the specifically described embodiments can be carried out without departing from the scope of the invention which is intended to be limited only by the scope of the appended claims and any equivalents thereof.

I claim:

1. A ramp apparatus comprising:
   a first rectangular ramp member, wherein said first rectangular ramp member includes a first leg and a second leg an arcuate insert attached to said first ramp member;
   a second rectangular ramp member, wherein said second rectangular ramp member includes a third leg and a fourth leg;
   a channel insert attached to said second ramp member;
   and wherein said arcuate insert is configured to pivotally engage said channel insert;
   a first slotted segment formed on a first side of said first leg;
   a first corresponding slotted segment formed on a first side of said second leg;
   a first cross-member placed within said first slotted segment interconnecting said first leg and said second leg;
   a second slotted segment formed on a first side of said third leg;
   a second corresponding slotted segment formed on a first side of said fourth leg;
   a second cross-member placed within said slotted segmented interconnecting said third leg and said fourth leg;
   a first ledge formed on said arcuate insert, said first ledge being received within said first slotted segment of said first rectangular ramp member.

2. The ramp apparatus of claim 1 further comprising:
   a second ledge formed on said channel insert, said second ledge being received within said second slotted segment of said second rectangular ramp member.

3. The ramp apparatus of claim 2 further comprising:
   a first lip formed on said arcuate insert and configured to engage an underside of said first leg and said second leg of said second rectangular ramp.

4. The ramp apparatus of claim 3 further comprising:
   a second lip formed on said channel insert and configured to engage an underside of said first leg and said second leg of said first rectangular ramp.

5. The ramp apparatus of claim 4 wherein said first cross-member placed between said first and second leg and said second cross-member placed between said third and fourth leg is a cross-mesh aluminum metal member.

6. The ramp apparatus of claim 4 wherein said first cross-member placed between said first and second leg and said second cross-member placed between said third and fourth leg is a plurality of aluminum metal bars.

7. A ramp apparatus comprising:
   a first ramp member having a first leg and a second leg, and wherein said first and second leg contain a first elongated slot;
   a channel insert adapted within said first elongated slot;
   a second ramp member having a third leg and a fourth leg, and wherein said third and fourth leg contain a second elongated slot;
   an arcuate insert adapted within said second elongated slot; and wherein said arcuate insert is configured to pivotally engage said channel insert;
   a first cross-member placed within said first elongated slot interconnecting said first leg and said second leg;
   and wherein said arcuate insert has a cured apex that is adapted to be received within an elongated channel of said channel insert.

8. The ramp apparatus of claim 7 further comprising:
   a second cross-member placed within said second elongated slot interconnecting said first leg and said fourth leg.

9. The ramp apparatus of claim 8 further comprising:
   a first ledge member extending from said channel insert, said first ledge member being received within said first elongated slot of said first rectangular ramp member.

10. The ramp apparatus of claim 9 further comprising:
    a second ledge member extending from said arcuate insert, said second ledge member being received within said second elongated slot of said second rectangular ramp member.

11. The ramp apparatus of claim 10 further comprising:
    a first lip formed on said arcuate insert and configured to engage an underside of said third leg and said fourth leg of said second rectangular ramp.

12. The ramp apparatus of claim 11 further comprising:
    a second lip formed on said channel insert configured to engage an underside of said first leg and said second leg of said first rectangular ramp.

13. The ramp apparatus of claim 12 wherein said cross-member placed between said first and second leg and said cross-member placed between said third and fourth leg are constructed of an aluminum metal member.

* * * * *